Figure 1:
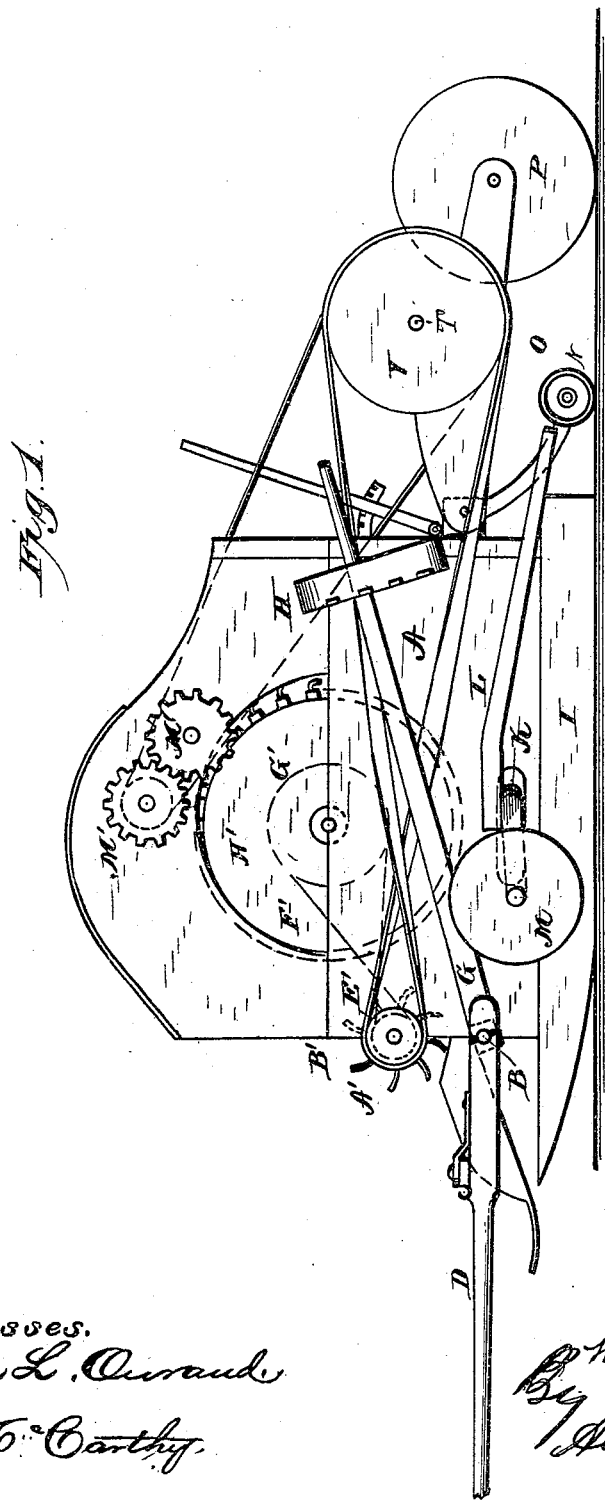

(No Model.)

2 Sheets—Sheet 1.

W. GOODWIN.
Cotton Picker.

No. 242,301.                    Patented May 31, 1881.

Witnesses.
Franck L. Ourand
J. J. McCarthy

Inventor.
Williamson Goodwin
By Alexander Mahr
Atty (No Model.) 2 Sheets—Sheet 2.
W. GOODWIN.
Cotton Picker.
No. 242,301. Patented May 31, 1881.
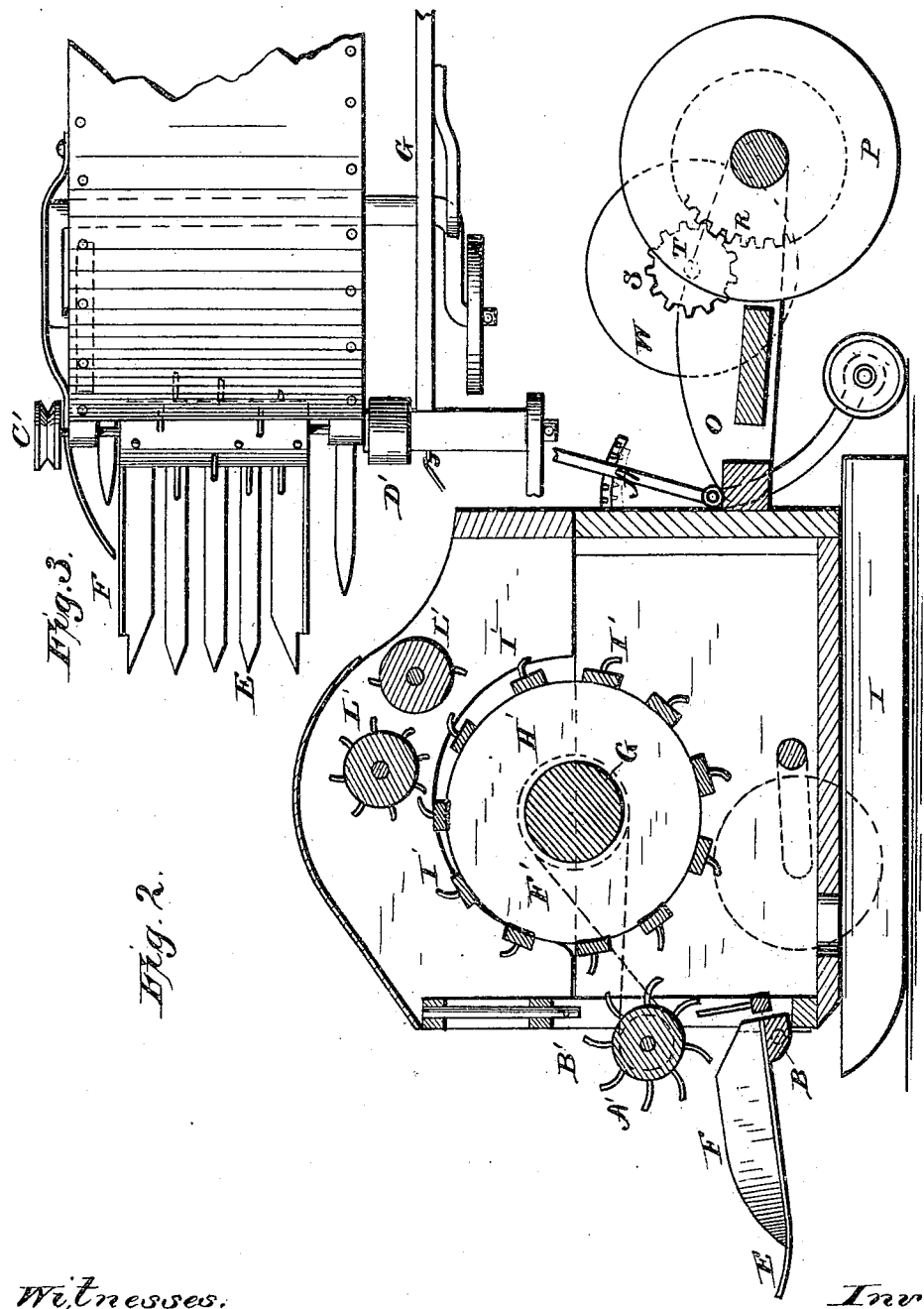
Witnesses:
Franck L. Ouraud.
J. J. McCarthy.
Inventor.
William Goodwin
By Alexander Mason

UNITED STATES PATENT OFFICE.

WILLIAMSON GOODWIN, OF MORO, ARKANSAS.

COTTON-PICKER.

SPECIFICATION forming part of Letters Patent No. 242,301, dated May 31, 1881.

Application filed February 23, 1881. (No model.)

*To all whom it may concern:*

Be it known that I, WILLIAMSON GOODWIN, of Moro, in the county of Lee, and in the State of Arkansas, have invented certain new and useful Improvements in Cotton-Pickers; and I do hereby declare that the following is a full, clear, and exact description thereof, reference being had to the accompanying drawings, and to the letters of reference marked thereon, making a part of this specification.

This invention relates to certain improvements in apparatus for picking and gathering cotton from the growing cotton-plants, and it has for its objects to provide a machine which will automatically adjust itself to the character of the ground and the variety and nature of the plants to be operated upon, as more fully hereinafter specified. These objects I attain by the apparatus illustrated in the accompanying drawings, in which—

Figure 1 represents a side elevation of my improved apparatus. Fig. 2 represents a longitudinal vertical section thereof, and Fig. 3 represents a partial top view of the same.

The letter A indicates the body of my apparatus, which may be constructed of wood or other suitable material.

B indicates a transverse shaft journaled in bearings at the forward end of the machine. This shaft extends to one side and has secured to it the tongue D, to which the draft-animals are hitched. The said shaft B is provided with a series of fingers, E, which are curved upward at their lower ends and pointed. The fingers at each side of the machine are provided with shields F.

The letter G indicates a lever secured to the shaft B and extending toward the rear of the apparatus, where it passes through a ratcheted bracket, H, by which it may be held in any desired position. The fingers E are of sufficient weight to overbalance the lever, so that they will be held automatically to the ground, but will be permitted to rise and pass over obstructions.

The machine is mounted on runners I, and is provided with a transverse shaft, K, journaled in suitable bearings. The said shaft is bent at its ends and is provided with a lever, L, by means of which it may be operated to raise the machine on the wheels M. The rear of the body may also be provided with casters N, for a similar purpose.

The letter O indicates a section hinged to the rear of the apparatus. This carries the driving-wheel P, by which motion is communicated to the working parts of the machine. The said driving-wheel is provided with cogged gearing R, which intermeshes with a cog-pinion, S, of a shaft, T, journaled in bearings in the hinged section. The said shaft at its respective ends is provided with pulleys V W, which connect by bands with the moving parts of the gathering and cleaning mechanism and transmit motion to the same.

The letter A' indicates the gatherer, which consists of a roller journaled in suitable bearings at the front of the machine. The said roller is provided with the bent pickers B', and its shaft at the ends carries the pulleys C' and D'. The pulley D' connects, by means of a band, E', with the pulley V, and the pulley C', by means of a cord, F', with a pulley, G', on the shaft of the cleaning-drum H', which is provided with transverse slats on its periphery, having bent teeth I'.

The letter L' indicates two separating-rollers, provided with wire teeth, carrying at their ends at one side intermeshing cog-wheels M', one being provided at the opposite side with a pulley, which connects, by means of a suitable band, with the pulley W.

It will be seen that as thus constructed the machine will adjust itself to the nature of the ground, and that the rear section by rising and falling enables the machine to be worked across the rows of plants as well as along them.

Having thus described my invention, what I claim, and desire to secure by Letters Patent, is—

1. The combination, with the body of the machine and its picking and gathering mechanism, of the rear hinged section, O, the driving-wheel P, provided with gearing engaging a cog-pinion upon the shaft T, journaled in bearings in said hinged section, the pulleys also carried by said hinged section, and the driving-belts for transmitting motion from said pulleys to the gathering, cleaning, and separating mechanism, substantially as described.

2. The combination, with the body of the machine and its picking and gathering mechanism, of the hinged rear section, O, supported upon the driving-wheel P, and carrying the requisite gearing and pulleys for transmitting motion by belt-power to the operative parts of the machine, which is adapted to be raised or lowered, as set forth, whereby said rear section will adapt itself to the elevation of the main body of the machine.

3. The combination, with the fingers E, of the transverse shaft B, the lever G, the rack-bar H, and the pole upon said transverse shaft, as specified.

In testimony that I claim the foregoing I have hereunto set my hand this 21st day of February, 1881.

WILLIAMSON GOODWIN.

Witnesses:
J. J. McCARTHY,
JOE RUSSELL.